United States Patent [19]

Brusov et al.

[11] 3,735,969
[45] May 29, 1973

[54] METHOD OF THERMAL AND CHEMICAL TREATMENT OF FINELY-DIVIDED MATERIALS

[76] Inventors: Lev Petrovich Brusov, bulvar Shakhtostroitelei, 22, kv. 32, Donetsk; Dmitry Pavlovich Vasilevsky, ulitsa Pravdy, 5, kv. 9, Kharkov; Vasily Ivanovich Dorokhov, ulitsa Dzerzhinskogo, 34, kv. 6, Kharkov; Vasily Petrovich Onoprienko, ulitsa Sumskaya, 118, kv. 16, Kharkov, all of U.S.S.R.

[22] Filed: Aug. 13, 1971

[21] Appl. No.: 171,766

Related U.S. Application Data

[62] Division of Ser. No. 52,196, July 6, 1970.

[52] U.S. Cl. ..................................266/24, 75/26
[51] Int. Cl. ................................F27b 1/04
[58] Field of Search ..........................266/24; 75/26

[56] References Cited

UNITED STATES PATENTS 2,365,194  12/1944  Hodson et al. .........................266/24

*Primary Examiner*—Gerald A. Dost
*Attorney*—Waters, Roditi, Schwartz & Nissen

[57] ABSTRACT

The invention relates to the branches of industry in which finely-divided materials are subjected to thermal and chemical treatment in a flow of gas.

The method of thermal and chemical treatment of finely-divided materials according to the invention is characterized in that it includes the preparations of gas-suspended matter from the material and gas, conveyance of the material in the gas-suspended state accompanied by concurrent partial treatment with gas, gas-dynamic classification of the material, then its complete treatment during which the working gas and and material move in contrary directions.

The installation for the realization of this method in accordance with the invention comprises a device for the preparation of gas-suspended matter, a device for partial treatment and conveyance of the material in the gas-suspended state, and a multistage reaction plant for the complete treatment of the material in the gas-suspended state, made in the form of several concentric chambers forming a common working space hermetically-sealed from the atmosphere and intercommunicating with one another via the chamber for gas-dynamic classification of the material being treated.

4 Claims, 1 Drawing Figure

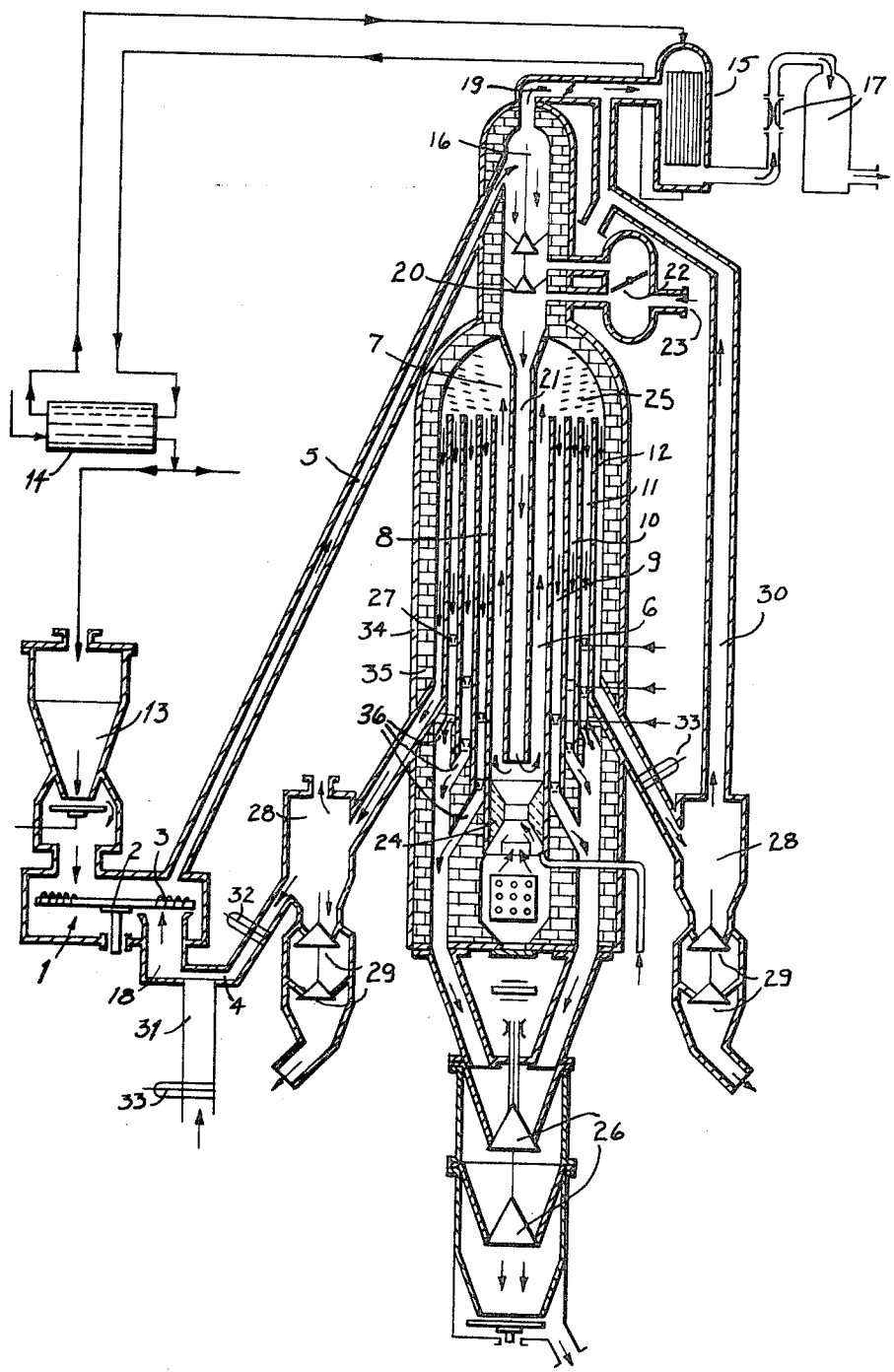

METHOD OF THERMAL AND CHEMICAL TREATMENT OF FINELY-DIVIDED MATERIALS

This application is a divisional application of Ser. No. 52,196; filed July 6, 1970.

The present invention relates to such branches of industry where finely-divided materials are subjected to thermal and chemical treatment in a gas flow and more specifically it relates to the method of thermal and chemical treatment of finely-divided materials not over 0.5 mm in size and to the installation for the realization of said method.

The invention can be utilized in, say, metallurgical industry for reducing roasting of iron ores (direct production of powdered metals, metallization of concentrate and ore fines, magnetic roasting of hard-to-beneficiate ores, etc.); for oxidizing roasting of sulphide and other noferrous ores; for calcination of cement clinker; and for drying the finely-divided materials.

Widely known and used in industry are the methods of thermal and chemical treatment of finely-divided materials with the aid of gases and installations for the realization of these methods.

The most widespread method of treatment of finely-divided materials in powder metallurgy is, for example, the Hoganes method in which the materials are treated in a stationary layer.

The method of treating materials in a stationary layer is noted for its low efficiency so that the installations for its realization are characterized by a low specific capacity.

Besides, the processes taking place in a stationary layer are difficult to control which results in high operational and labor costs. Such processes are resorted to in the production of relatively expensive and specialized materials. The installations for the realization of this method (crucibles, trays, capsules with muffle, tunnel, rotary-ring and other types of furnaces, grates with a piled-on layer, etc.) have a low rated capacity (about 15,000 tons of sponge iron a year).

Known in the art is a method of treating materials by conveying them in a direct flow of gas, for example in treating the iron-ore concentrates.

This method of treating materials by conveying them in a direct flow of gas is characterized by a high efficiency. However, a substantial disadvantage of this method lies in that the thermal and chemical properties of gas are insufficiently utilized within a working cycle. This has led to an advent of multicycle installations for treating materials in direct flow of gas. These installations are more efficient as regards the utilization of gas. However, the installations for multicycle treatment of finely-divided materials (multistage reaction plants, cyclone batteries, systems of swirlchambers, etc.) are likewise extremely bulky. The transfer of the material from one stage to another is difficult and the transferring mechanisms are, as a rule, not reliable. Therefore, the methods of multicycle treatment of finely-divided materials in direct flow of gas has not been widely adopted in industry.

Also known in the art is a method of treating the finely-divided materials with gas in shaft furnaces in boiling-layer reaction plants and in moving-bottom installations.

This method is economically inefficient due to a large amount of untreated material carried outside by gas. As a result, the treatment characteristics per unit of the finished product are considerably impaired (gas consumption grows and the heat utilization factor becomes lower).

An object of the present invention resides in eliminating the disadvantages inherent in the known methods of thermal and chemical treatment of finely-divided materials and in the installations for their realization.

The main object of the invention resides in providing a method of thermal and chemical treatment of finely-divided materials not exceeding 0.5 mm in size, and an installation for its realization which would intensify the process of treatment, cut down the consumption of gas and increase the heat utilization factor.

This object is accomplished by providing a method consisting of such operations as preparation of a gas-suspended matter from the material being treated and gas, conveyance of said material in the gas-suspended state and its full treatment with gas in which, according to the invention, concurrently with conveyance of the material the latter is partly treated with gas, then subjected to gas-dynamic classification after which it is fully treated, the working gas and the material flowing in opposite directions.

For the realization of said method the installation, according to the invention, comprises a device for preparing the gas-suspended matter, a device for partial treatment and conveyance of the material in the gas-suspended state into the multistage reaction plant for full treatment of the material, said reaction plant being made in the form of several concentric chambers forming a common working space hermetically-sealed from the atmosphere and intercommunicating in the top part by means of the chamber for preliminary gas-dynamic classification of the material being treated.

Further details of the invention consist in different designs of the device for preparing the gas-suspended matter and of the device for partial treatment and conveyance of the material in the gas-suspended state.

The device for preparing the gas-suspended matter may be made in the form of a rotating feeder table with a no-sifting grate, installed above a collector for the outflowing working gas, said collector being in communication with the multistage reaction plant.

The device for partial treatment and conveyance of the material in the gas-suspended state can be made in the form of a gas lift connected with the device for preparing the gas-suspended matter, and a central chamber communicating with said lift through a cyclone and a gas gate, said central chamber being located inside the concentric chambers and provided with a diaphragm through which the working gas is delivered for further partial treatment and conveyance of the material.

The claimed invention has high technical and economical characteristics which have been proved during extensive tests of the claimed method on experimental and semi-industrial installations.

The tests have yielded the following results.

The losses of the untreated material carried out of the installation are brought down to a minimum (not over 0.1 percent).

The process of treatment of the finely-divided material is intensified to such an extent that the specific capacity of the installation (the amount of product per unit of the useful volume of the installation per unit of time) is 7 to 50 times higher than the specific capacity of the known installations performing the corresponding operations (roasting of ores, metallization of iron-ore concentrates,etc.).

The installation is simple in manufacture which, along with its high specific capacity allows the capital investments to be reduced by 30 percent as compared with the specific capital investments required for the installations intended for the same operations. For example, the capital investments for the construction of the installation according to the claimed method for metallizing roasting of iron-ore concetrate with a yearly capacity over 1 million tons are equal to only 80–90 percent of the capital investments required for the construction of one hot-blast stove of a modern blast furnace, whereas the capital investments for the construction of the installation according to the same method for magnetic roasting followed by benefication and pelletizing of iron ores are not over 90 percent of the investments required for the construction of a line of units of a corresponding capacity and intended solely for the hardening firing of pellets.

The claimed method ensures the fullest and most efficient utilization of heat and of the gas characteristics so that the amount of heat required for magnetic roasting of wet quartizites (moisture content 4 percent) is less than 280,000 Kcal per ton of source materials while the amount of natural gas required for the metallization of rich iron-ore concentrates can be reduced to 200 $m^3$ per ton of the finished product at 90 percent metallization of iron.

Any process carried out on the basis of the claimed method in the claimed installation can be easily checked and controlled and can therefore be fully mechanized and automated which allows the amount of servicing to be reduced to a minimum required for supervising the operation of the mechanisms and apparatuses.

The rated capacity of the installation operating according to the claimed method may be higher than than of the most efficient modern installations used in heavy industry, such as modern blast furnaces, oxidizing steel converters, electric furnaces, etc.

Besides, the claimed method requires no use of water and the outflowing gas can be completely utilized by means of recirculation and be fully cleaned of the treated material because the claimed installation can work at any preset over-pressure of gas inside the working space. In consequence, the proposed method and the installation for its realization can be constructed anywhere, including areas where water is scarce, in densely-populated localities, in areas with particularly exacting demands as regards the purification of industrial waste in order not to pollute the air and water basins.

Now the invention will be described by way of example with reference to the accompanying drawing which illustrates a general view of the installation and shows diagrammatically the flow of gas and materials for the realization of the method.

The installation for the realization of the claimed method comprises a device 1 for preparing gas-suspended matter from the material being treated, said device consisting of a rotary feeder table 2 equipped with a no-sifting grate 3, and a collector 4 for the outflowing gas; a device for partial treatment and conveyance of the material in the gas-suspended state consisting of a tubular gas lift 5 and a central chamber 6 communicating with said lift; a chamber 7 for the preliminary gas-dynamic classification of the material being treated, and a multistage reaction plant 8 located under said chamber 7 and intended for complete treatment of the material. The reaction plant 8 is made in the form of concentric vertical annular chambers 9, 10 and 11, the chamber 9 fitting around said central chamber 6. The vertical end chamber 12 adjoining the outer side of the chamber 11 communicates at the bottom with the outflowing gas collector 4. The chambers 9,10,11 and 12 intercommunicate at the top via the chamber 7, forming a common working space, hermetically-sealed from the atmosphere.

The thermal and chemical treatment of the materials according to the claimed method is carried out as follows.

The finely-divided source material is fed through the batching devices 13 in the form of disc feeders onto the no-sifting grate 3 of the rotary feeder table 2. If the source material delivered for treatment is so wet that it has lost its friability, such a material should be dried before being fed into the batching device 13; this takes place in a drum drier 14, where the material is dried with air heated in a recuperator 15 by the waste gases leaving the installation after the cyclone 16. The use of the recuperator 15 and drier 14 is practicable also when the installation is equipped with a device 17 for scrubbing the waste gas for the purpose of reducing the gas temperature before scrubbing and improving the utilization of heat of the waste gas.

After the rotary feeder table 2 has turned through a certain angle, the material is fed from the no-sifting grate 3 of said table 2 under the stream of the outflowing gas discharged by the feed pipe 18 from the gas collector 4; then it is caught by the outflowing gas and, forming a gas-suspended matter, is conveyed by the same gas through the tubular gas lift 5. Concurrently with this conveyance, the material is partly treated by the conveying gas, including drying and heating.

Preparation of the gas-suspended matter, conveyance and partial treatment of the material can be performed in various modifications of the claimed method either in the gas flowing out of the installation or in any other additionally introduced gas whose pressure is higher than that of the working gas. The composition of the gas for the conveyance of the gas-suspended matter may also differ from the composition of the working gas and that of the working gas discharged from the installation.

In all the modifications of the method the gas-suspended matter flows from the gas lift 5 into the cyclone 16. The cyclone 16 is intended to turn the flow of the gas-suspended matter sharply (through more than 90°) without considerable wear of the tubular gas lift 5 at the point of the turn and to separate the material from the conveying gas. After the cyclone 16, the gas flows through the pipe 19 and recuperator 15 into the scrubbing device 17 whereas the material falls down through a double-cone gas gate 20 and pipe 21 into the central chamber 6. To ensure troublefree functioning of the double-cone gas gate 20 and pipe 21, the gate 20 is fitted with a bypass 22 and a gas feed pipe 23.

Having left the pipe 21, the material gets into a contrary-moving stream of working gas which flows from the diaphragm 24 mounted in the lower part of the central chamber 6.

The moving material turns through almost 180° and is conveyed along the central chamber 6. Here the material is again subjected to a partial treatment both in the contrary-moving stream of the working gas and in the direct gas flow, when the material moves up the central chamber 6.

Partly treated by the working gas, the material is conveyed in the gas-suspended state from the central chamber 6 into the chamber 7 for preliminary gas-dynamic classification. The chamber 7 is made in the form of a spherical segment whose lower part is in communication with the upper parts of the chambers 6,9,10,11 and 12. Passing through the chamber 7 from the central chamber 6 to the end chamber 12, the flow of the gas-suspended matter gradually loses speed thereby ensuring the classification of the particles in accordance with their gas-dynamic properties: the particles moving at a higher floating speed (this refers, as a rule, to larger particles) fall out of the stream and settle in the vertical annular chamber 9; the particles with a lower floating speed get into the vertical annular chamber 10 and the smallest particles of the treated material possessing the lowest floating speed are separated from the stream of the gas-suspended matter into the vertical annular chamber 11 or are carried by gas into the end chamber 12.

To increase the efficiency of the preliminary classification of the particles of the material in accordance with their gas dynamic properties and improve their separation from the flow of the gas-suspended matter, the chamber 7 for preliminary gas-dynamic classification is fitted with a louver separator 25.

The preliminarily classified and partly treated material emerging from the chamber 7 settles in the vertical annular chamber 9,10 or 11, depending on the gas-dynamic properties of its particles. The falling particles are met by the working gas moving up through the concentric vertical annular chambers 9,10 and 11, said gas being of adequate speed, pressure, temperature and composition. Moving through the contrary-directed flow of the working gas, the material is fully treated and the finished product is unloaded from the installation through the gas gate 26 installed in the lower part of the vertical annular chambers 9,10 and 11.

The fully treated product is unloaded from the installation through gas gate 26 in two possible variants.

Thus, the classified product may be removed from chambers 9 through 11 after commingling, or alternatively the product may be removed without commingling, in effect by separate unloading of the classified product from each of the chambers 9, 10 and 11 separately.

Thus, the specification and drawing show a variant in which the classified product is removed from chambers 9 through 11 after commingling.

In the second variant wherein the installation provides for the separate unloading of the classified product without commingling, the installation may be equipped with three gas gates 36, which are quite similar to gas gate 26, mounted in the lower portion of each of the vertical annular chambers 9, 10 and 11. This would enable the installation to operate with the unloading of either mixture of the products or with the unloading of the classified products from each of the chambers 9, 10 and 11 separately.

The working gas of the required parameters is fed into the vertical annular chambers 9,10 and 11 through tuyeres 27 located under said chambers 9,10 and 11.

After treating the material, the working gas which leaves the vertical annular chambers 9, 10 and 11 enters the chamber 7 for preliminary classification of the material. The final gas-dynamic classification of the material is done by the working gas in the chambers 9,10,11. The particles whose floating speed does not correspond to the speed of the working gas in the chamber into which they have wrongly entered, are transferred by the working gas into another chamber in which the parameters of the working gas correspond to the gas-dynamic characteristics of the particles in question. The gas-dynamic classification of the material (i.e. classification according to its gas-dynamic properties) followed by its full treatment in a contrary-moving flow of working gas ensures the formation of a suspended-boiling layer thus guaranteeing high efficiency of the installation operated in accordance with the claimed method.

The entire amount of gas flowing from the installation, after the chamber 7 for the preliminary classification of the material, together with a part of the already processed material enters the end chamber 12 and further, after the settling chambers 28, passes into the gas collector 4 which connects the end chamber 12 with the device 1 for the preparation of the gas-suspended matter. In the settling chambers 28 a considerable proportion of the treated material which is entrained by the gas is settled and then emptied from the installation through the gas gate 29. The further route of the gas has been described above.

In the modified installation where the gas-suspended matter is prepared and conveyed through the gas lift 5 by means of an additionally-introduced gas whose pressure is higher than that of the working gas, the gas flowing out of the installation after the settling chambers 28 passes through the pipe 30 into the recuperator 15 and the scrubber 17.

The additionally introduced gas is supplied into the device 1 for preparing the gas-suspended matter via the pipe 31.

In this modification of the method, the gate 32 of the installation is closed but the gates 33 are open.

An optimum feature of the installation lies in that the material is entirely conveyed, classified and treated by the gas of the corresponding parameters (pressure, speed, temperature and composition). All the main components of the installation are in communication with one another and form a common working space allowing of the free movement of gas and material in the direction required by the process. The entire working space consisting of individual intercommunicating elements is hermetically-sealed from the atmosphere by a steel housing 34 lined inside by refractory bricks 35 and heat-insulated.

What we claim is:

1. An installation for thermal and chemical treatment of finely-divided materials not over 0.5 mm in size, mainly for the metallization of iron-ore materials comprising: a device for the preparation of gas-suspended matter; devices for partial treatment and conveyance of said material in the gas-suspended state, arranged consecutively along the flow of said gas-suspended matter after the device for the preparation of said gas-suspended matter; a chamber for gas-dynamic classification of said material located after said devices for the conveyance of said material in the gas-suspended state and for partial treatment of said material; a multistage reaction plant for complete treatment of said classified material in the gas-suspended state, consisting of several concentric chambers forming a common working space hermetically sealed from the atmosphere and intercommunicating at the top through said chamber for gas-dynamic classification of the material being treated.

2. An installation according to claim 1 wherein said device for the preparation of gas-suspended matter is made in the form of rotary feeder table with non-sifting grate located above the collector of the outflowing working gas, said collector being in communication with said multistage reaction plant.

3. An installation according to claim 1 wherein said devices for partial treatment and conveyance of the material in the gas-suspended state are made in the form of a gas lift communicating with said device for the preparation of gas-suspended matter, and a central chamber communicating with said lift via a cyclone and a gas gate, said central chamber being located inside said concentric chambers and provided with a diaphragm through which the working gas is supplied for the subsequent partial treatment and conveyance of the material.

4. An installation according to claim 2 wherein said devices for partial treatment and conveyance of the material in the gas-suspended state are made in the form of a gas lift communicating with said device for the preparation of gas-suspneded matter, and a central chamber communicating with said lift via a cyclone and a gas gate, said central chamber being located inside said concentric chambers and provided with a diaphragm through which the working gas is supplied for the subsequent partial treatment and conveyance of the material.

* * * * *